Dec. 4, 1934.    K. A. BRAINARD    1,982,853
VEHICLE
Filed May 12, 1933    6 Sheets-Sheet 1

KENNETH A. BRAINARD
INVENTOR.

BY
ATTORNEYS.

Dec. 4, 1934.　　　K. A. BRAINARD　　　1,982,853
VEHICLE
Filed May 12, 1933　　　6 Sheets-Sheet 2
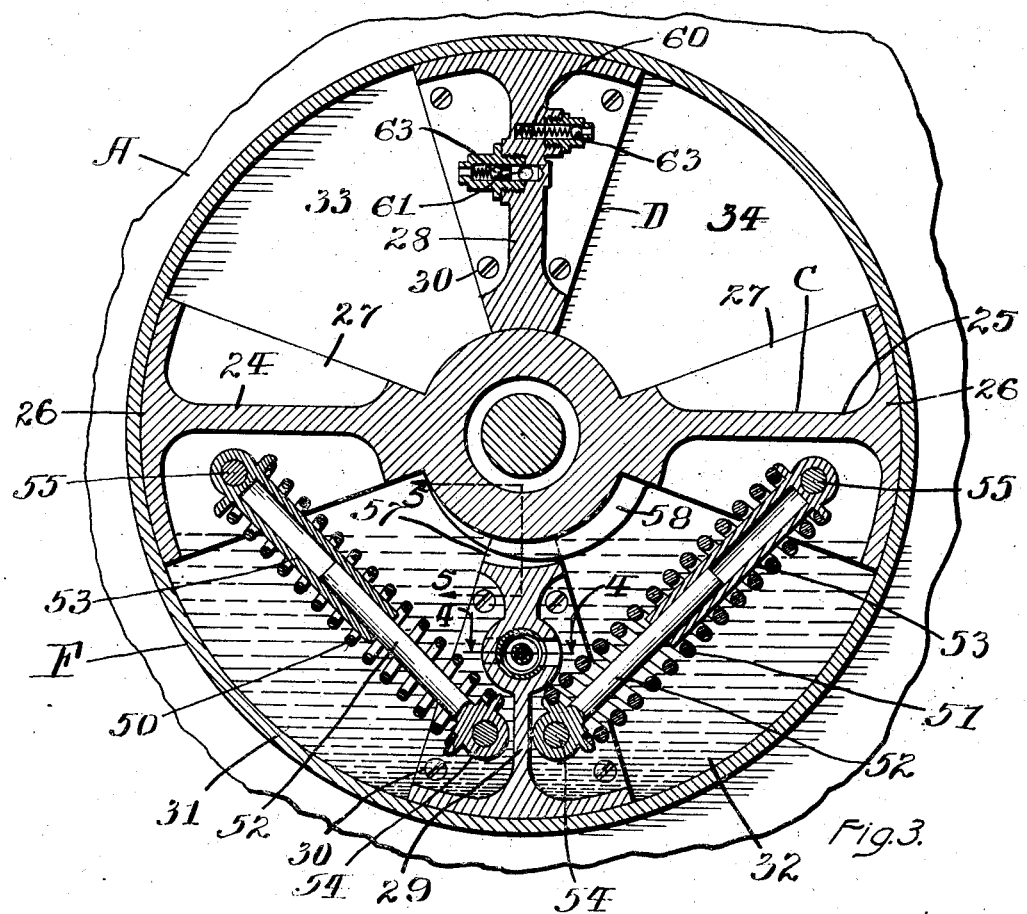
Fig. 3.
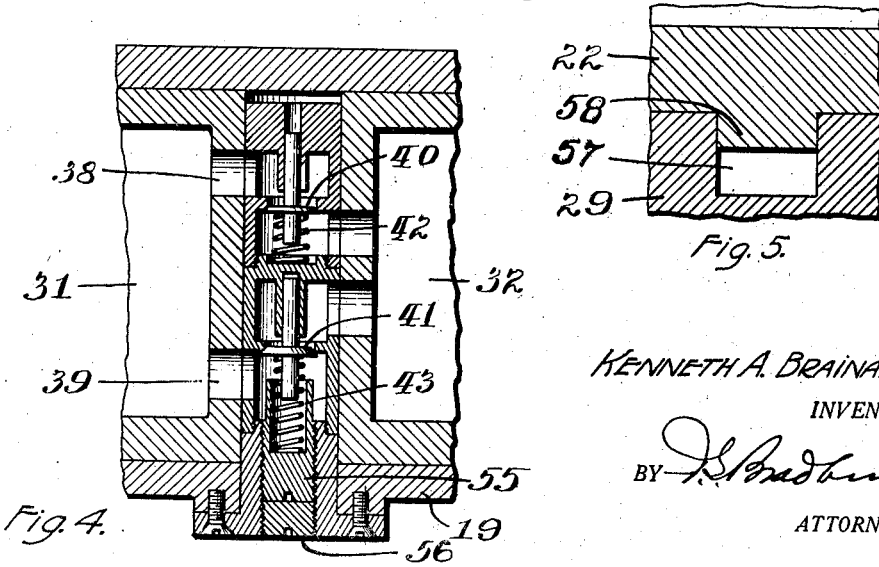
Fig. 4.
Fig. 5.
KENNETH A. BRAINARD
INVENTOR.
BY
ATTORNEYS.

Dec. 4, 1934.   K. A. BRAINARD   1,982,853
VEHICLE
Filed May 12, 1933   6 Sheets-Sheet 3

KENNETH A. BRAINARD
INVENTOR.

BY
ATTORNEYS.

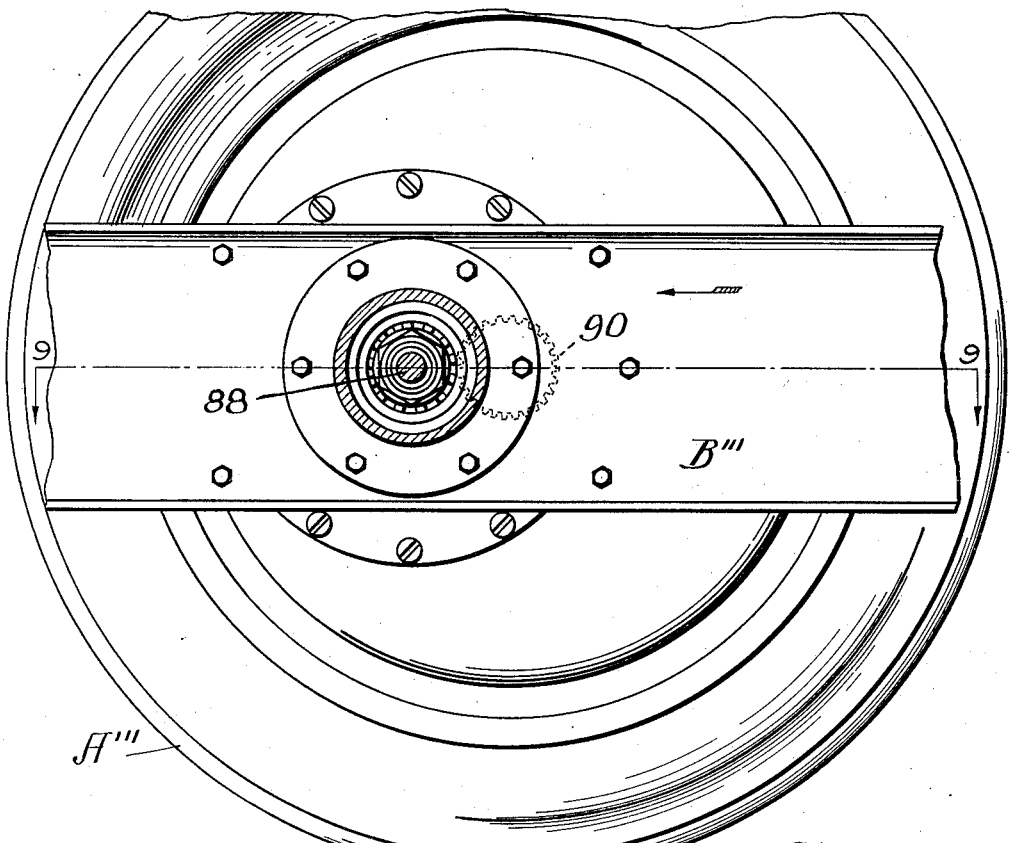
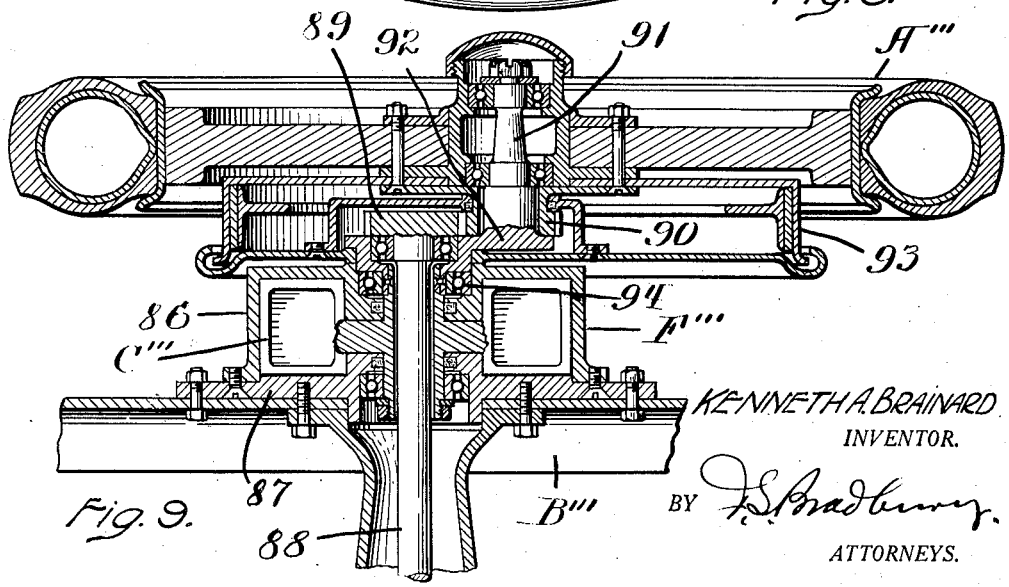

Dec. 4, 1934.　　K. A. BRAINARD　　1,982,853
VEHICLE
Filed May 12, 1933　　6 Sheets-Sheet 5

KENNETH A. BRAINARD
INVENTOR.

BY
ATTORNEYS.

Patented Dec. 4, 1934

1,982,853

UNITED STATES PATENT OFFICE 1,982,853

VEHICLE

Kenneth A. Brainard, Santa Monica, Calif.

Application May 12, 1933, Serial No. 670,620

34 Claims. (Cl. 267—15)

This invention relates to improvements in vehicles and more particularly to resilient means for mounting a load which is carried by wheels and to the driving connections between the prime mover and the wheels.

The primary object is to provide comparatively inexpensive means for securing a minimum of unsprung weight carried by the wheels and at the same time to eliminate many disconnected parts such as have been usually employed on other vehicles. In devices heretofore commonly used, the weight of the many disjointed parts, such as tie rods, drive shafts, torque tubes, universal joints, differentials, etc., are carried on springs. As a result every movement caused by said inequalities must of necessity be movably carried by the springs and guided, thus resulting in friction and wear. By the use of my improvement this friction and wear are reduced to a minimum. Further, the spring movement employed heretofore has been substantially vertical, thus only partially absorbing jolts and impact, while with my improvement the jolts and impact are cushioned longitudinally and transversely as well as vertically, thus producing a smoother riding vehicle and minimizing roughness and vibration. This also results in less crystallization of the parts. A further object is to unify and simplify the structure and association of parts employed and at the same time to produce effectiveness in use.

With these and other objects in view my invention comprises the features of construction and combination of parts hereinafter described and claimed.

Figure 1:
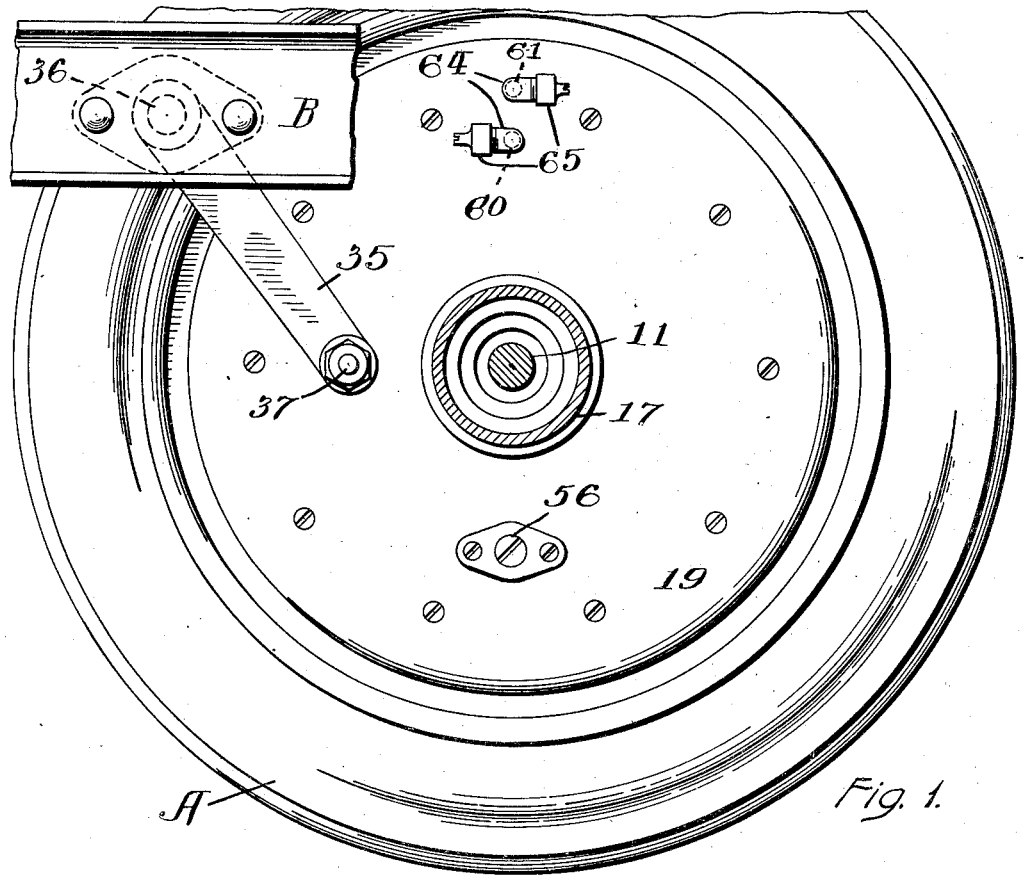
Figure 2:
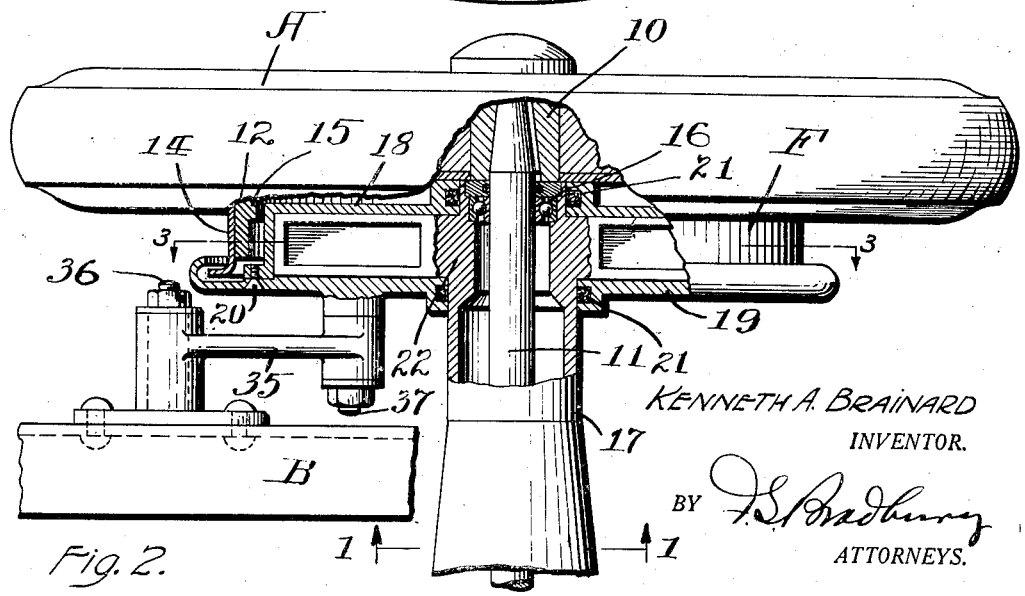
Figure 6:
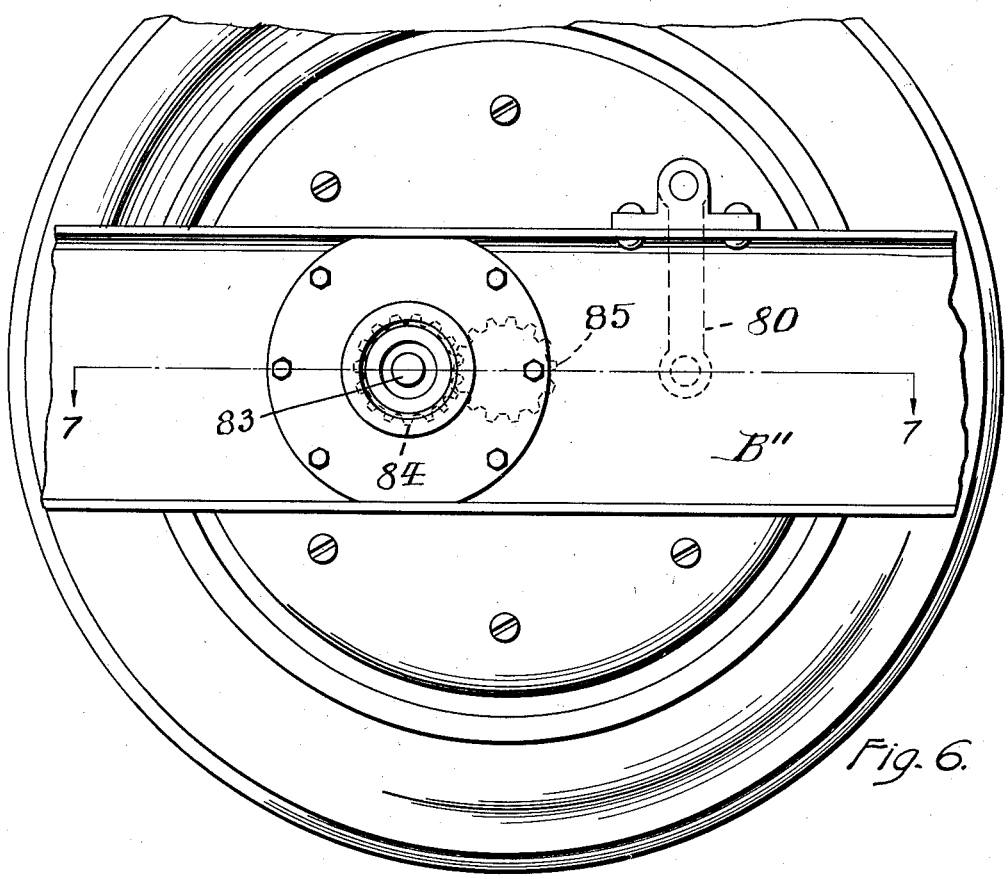
Figure 7:
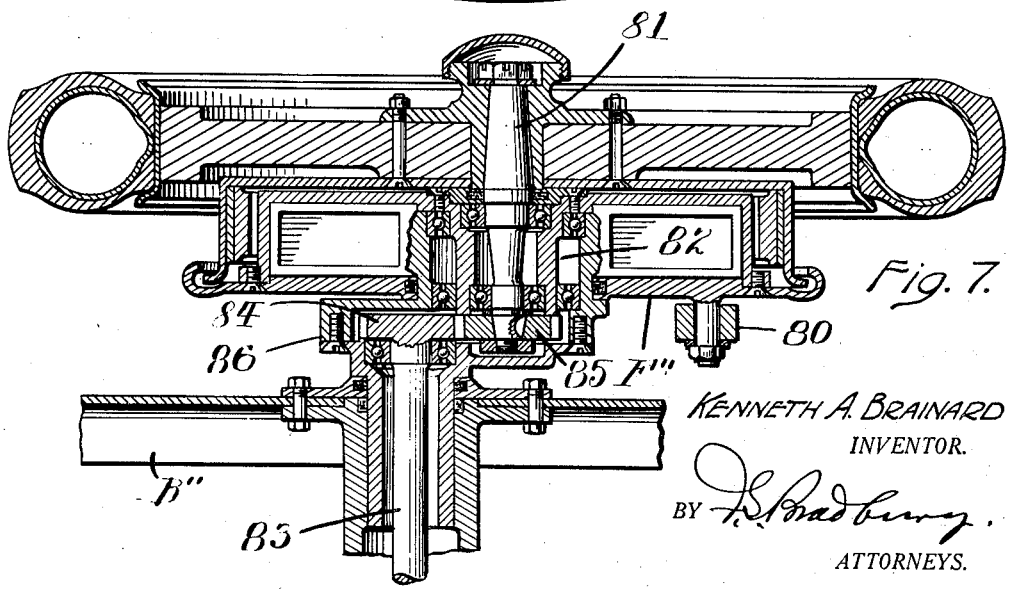
Figure 10:
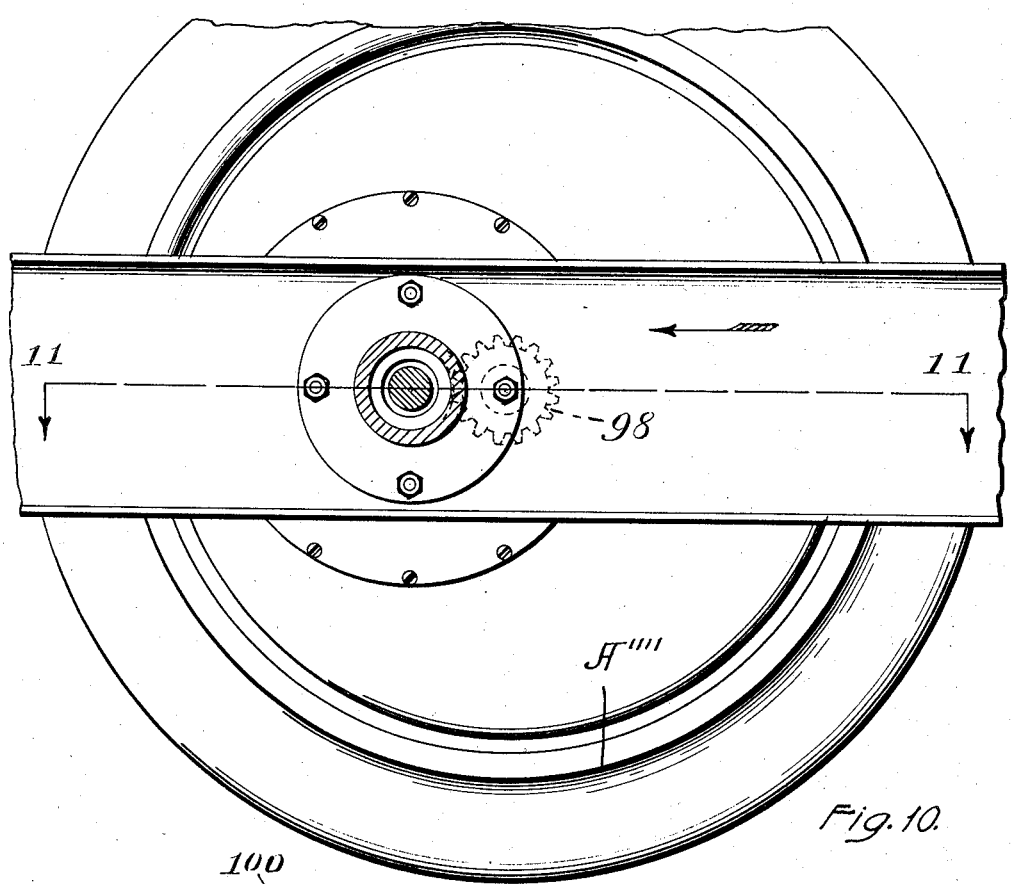
Figure 11:
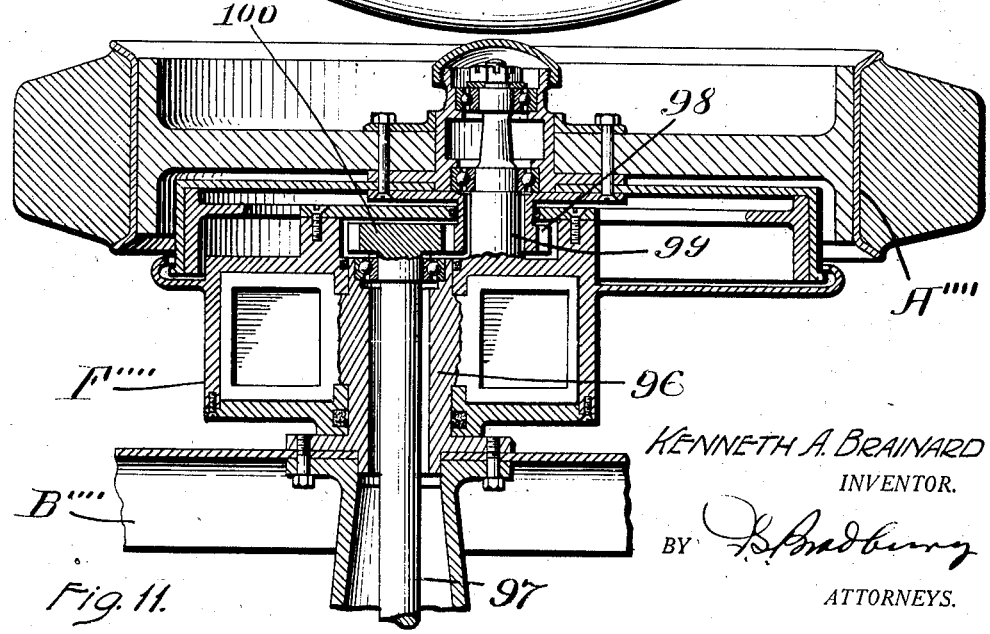
Figure 12:
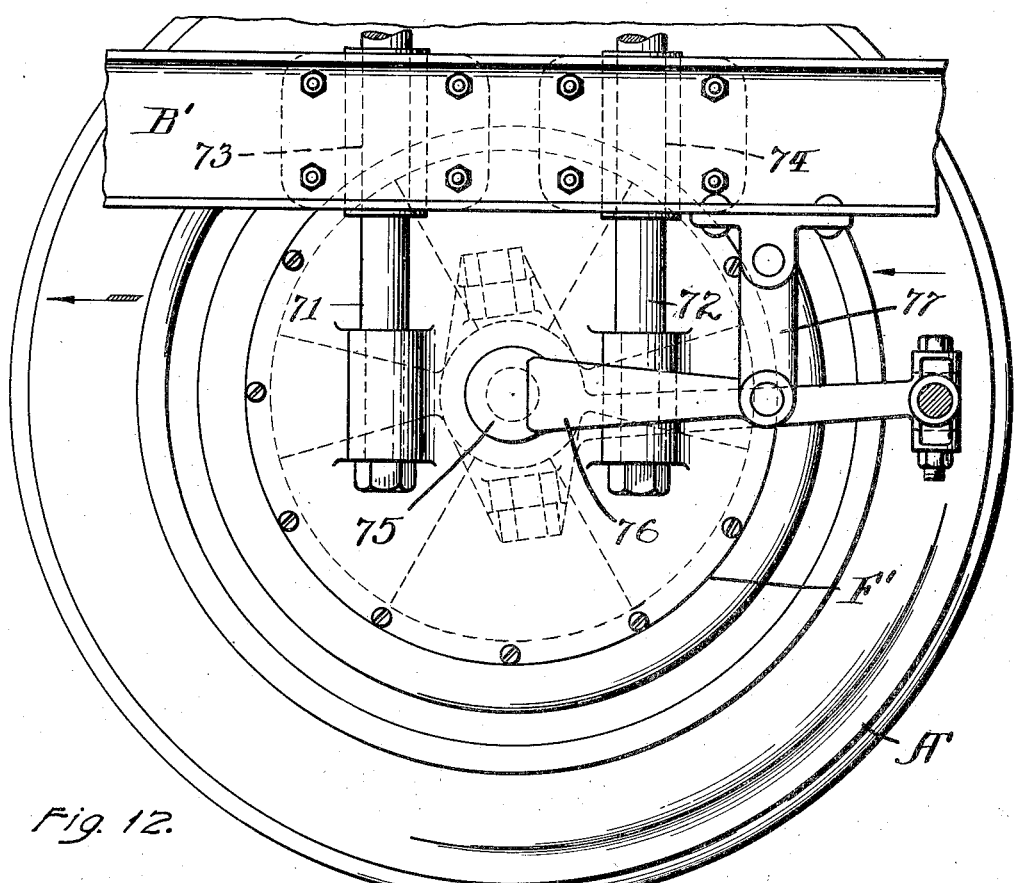
Figure 13:
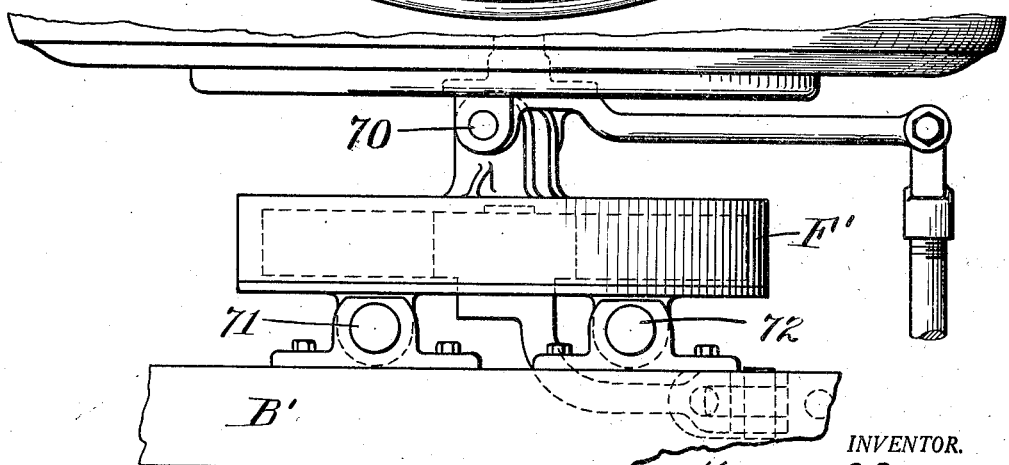

In the accompanying drawings forming part of this specification, Fig. 1 is a section of my invention taken on the line 1—1 of Fig. 2, showing partly in side elevation, one of the rear wheels of a vehicle and the application of a simple form of my improvement thereto; Fig. 2 is a plan of the structure shown in Fig. 1, part of the wheel, rear axle housing and my improved device being broken away and in section; Fig. 3 is a section taken on line 3—3 of Fig. 2; Fig. 4 is a section of a detail taken cn line 4—4 of Fig. 3; Fig. 5 is a section of a detail taken on the line 5—5 of Fig. 3; Fig. 6 is a side elevation of part of one of the rear wheels of a vehicle and its frame showing an alternative construction of my improvement applied thereto; Fig. 7 is a section taken on the line 7—7 of Fig. 6; Fig. 8 is a side elevation of one of the rear wheels of a vehicle and part of the frame showing another alternative construction of my improvement applied thereto; Fig. 9 is a section taken on the line 9—9 of Fig. 8; Fig. 10 is a side elevation of part of one of the rear wheels of a vehicle and the frame, showing another alternative construction of my improvement applied thereto; Fig. 11 is a section taken on the line 11—11 of Fig. 10; Fig. 12 is a side elevation of part of one of the front wheels of a vehicle and of a detail of the frame showing another form of construction embodying my improvement; and Fig. 13 is a plan of the structure shown in Fig. 12.

This invention provides a resilient support between the body and running gear of a vehicle, the load being poised between a plurality of resilient elements by means of which vibration and shocks are counteracted, the application of driving force is facilitated and the starting and stopping actions are neutralized, thus providing a vehicle having improved riding qualities, and greater strength, stability and flexibility. Among the applications of my invention for use, Figs. 1 to 5 show one form in which A indicates a wheel to be driven and B part of the frame of the vehicle with which the wheel is associated. The wheel has the usual hub 10 in which the section of the rear drive shaft 11, leading from the differential (not shown) is socketed and keyed in the usual manner. Mounted upon the inner face of the wheel is the brake drum 12 which is concentric and revolves with the wheel and associated with said drum are the outer and inner brake bands 14 and 15 which function in the usual manner and are employed to retard the revolution of the wheel when applied. The shaft 11 is journaled by antifriction bearing 16 in the hub 22 of the axle housing 17 leading from its usual differential (not shown). Concentrically arranged within the brake drum and about the axle housing and free to oscillate therein by suitable journaling is a sealed casing F having a shallow body 18 and a disc cover 19, the latter being secured thereto by screws 20 or other suitable fastening means. Suitable packing rings 21 serve to produce closely fitting movable joints between the sealed casing and axle housing. Arranged within the sealed casing F is an abutment C having said hub 22 integral with the axle housing and through which the axle is rotatably seated by said bearing. This abutment is formed with a pair of diametrically opposite stationary abutment walls 24 and 25 radiating from said hub. Each of these abutment walls is formed with a broad faced segment 26 and sides 27 which guide and provide a fluid and air tight working joint between the walls of the casing 18 and the abutment.

Rotatable about the hub 22 in casing F is a segmental diametrical impeller D which has a pair of separate impeller blades 28 and 29 disposed diametrically on opposite sides of the hub 22 and normally positioned at approximately 90 degrees to the abutment C. These impeller blades are secured tightly in the casing to its side walls and cover by screws 30 or other suitable fastening means and assist in producing a pair of hydraulic chambers 31 and 32 below the abutment and on opposite sides of the lower impeller blade 29. In somewhat the same manner a pair of pneumatic chambers 33 and 34 are produced above the abutment on opposite sides of the upper impeller D and its connected casing 18 being relatively revoluble about the axle housing of the vehicle.

The frame of the vehicle, a portion B of which is indicated in Fig. 1 is intended to be mounted upon the axle housing 17, in a manner peculiar to this invention and is movably connected to the side of the casing cover 19 by the supporting link 35, the latter being journaled to the frame by the stud bolt 36 and to the cover 19 by the stud bolt 37, and adapted to transmit forces which cushion jolts and impacts longitudinally, vertically and laterally between the frame B and axle housing 17.

In use the hydraulic chambers 31 and 32 of casing F are filled or partly filled with oil or other liquid and the pneumatic chambers 33 and 34 are initially started at atmospheric pressure. Normally the impeller D assumes median position in the casing, that is 90 degrees to the abutment C. In this condition any sudden jolts or impact transmitted between the frame B and axle housing 17 are retarded by the oscillating movement of the casing F about the hub 22 of the axle housing, through the resistance of the liquid and air against the sides of the impeller blades 29 and 28. The liquid in hydraulic chamber being denser than the air in the pneumatic chamber, greater resistance to the movement of the impeller blade 29 is imparted than by the air to impeller blade 28, and the air impeller blade 28 serves to supplement the action of the hydraulic impeller.

To assist in poising the impeller D in median position while normal, a pair of mechanical compression springs 50 and 51 each held over a pair of telescopic guide terminals 52 and 53 is interposed between the lower portion of the rigid abutment C and the impeller member D. The lower ends of the terminals 52 are secured to opposite sides of abutment 29 by pivot pins 54, while springs 50 and 51 extend upwardly and diverge apart, the upper ends of terminals 53 being secured to the outward portions of the sides 27 of the impeller walls 24 and 25 by pivot pins 55. These springs are of uneven tension, the tension of spring 51 being sufficient to suspend the load of the body frame which is transmitted downwardly by the link support 35 upon the casing F and from the casing to the abutment C. From the abutment said load is transmitted to the impeller D through said spring 50.

To modify the resistance of the hydraulic impeller in the casing and render the resistance greater for a heavy jar or blow than a light one, a liquid releasing valve mechanism (see Figs. 3 and 4) is provided between chambers 31 and 32 in the impeller blade 29. This valve mechanism has two valved passages 38 and 39 between said chambers. The size of the orifices of said passages is regulated by the relief valves 40 and 41 which are controlled by the compression springs 42 and 43. These valves face oppositely so that liquid is admitted against the action of closing valve 40 from chamber 31 into chamber 32, also against the closing action of valve 41 from chamber 32 back into chamber 31. The maximum flow of fluid back and forth is gauged by the size of passages 38 and 39 and the regulation of flow is secured by means of springs 42 and 43 or other resilient means, which tend to close the valves automatically. Tension of spring 42 being stronger than that of spring 43, the fluid is free to flow from chamber 32 into chamber 31 first and this action occurs under the blow, impact or movement downwardly of the body frame. The tension of spring 43 can be adjusted by turning a cup screw 55 in which the spring is socketed, said screw being accessible through the cover plate 19 after the removal of a lock screw 56. As the spring 43 is easily adjustable by hand, the shock absorption of the hydraulic portion of the device can be determined to suit road requirements from time to time.

To modify the resistance of the hydraulic impeller instantly under the action of the slightest impact or blow and ahead of the action by the valves 40 and 41, a fluid releasing passage 57 is provided between said chambers 31 and 32 adjacent to the hub 22 through which the fluid is released fairly rapidly from one hydraulic chamber to the other until the pressure is equalized after each jar or blow. This resistance is increased progressively under the action of heavy or light blows and decreased under the return movement of the impeller to normal position after the effect of the blow, by the use of an eccentric gate 58 on the periphery of the hub 23. This gate intercepts and traverses the passage 57 in the abutment wall 29 longitudinally. At normal position the passage 57 is of median size and jars or blows are restrained primarily by the flow of fluid through said passage. This restraining action causes the valves 40 and 41 to function as a secondary release of the fluid and the latter being finely adjusted by the springs causes the flow of fluid to be controlled minutely and to absorb all jars and blows.

The spring 51 is employed to resiliently carry the load of the frame in the event of failure to maintain adequate vacuum or air pressure in the pneumatic portion of the device to be hereinafter described. It restricts the action of the pneumatic portion of the device sufficiently to absorb shocks and jars. The spring 50 tends to return the impeller to normal or median position at all times.

The chambers or compartments 33 and 34 are substantially air tight. Chamber 34 is a vacuum or rarefied air chamber in which impeller blade 28 oscillates and the abutment C carries the load of the frame through its connection by the casing F. Chamber 33 is an air compression chamber operating to cushion the force of a blow or impact and to soften and retard the action during the return stroke when the return stroke has reached a point beyond neutral position. The two chambers are subject to inflation or exhaust by the employment of air service ducts 60 and 61, each of which is provided with an automatic valve 63. The ducts lead through outside adapters 64 on the inner face of the cover of the casing F and are closed by removable caps 65. In use the impeller oscillates in the chambers 33 and 34 and carries the load, thereby absorbing all jars and blows. From time to time the chambers 33 and 34 can be inflated or deflated to the pressure desired so as to carry the load smoothly and most effectively.

Assuming that a sharp impact is imparted to the wheels, a large flow of fluid through the passage 39 and past valve 41 from chamber 32 into chamber 31 occurs rapidly, in accordance with pressure exerted and being ultimately checked by valve 41. At the same time a reduction of flow of fluid occurs from chamber 31 into chamber 32 by diminishing the size of the orifice 57. This dampens the shock which has been absorbed by the pneumatic chambers.

The operation of the apparatus is as follows: Normally the load represented by the body frame B for illustration is transmitted to the casing F by the movable connecting link 35. From this casing the load is transmitted to the abutment C, from whence it is carried by the impeller, through the medium of the pneumatic mechanism supplemented by the mechanical spring mechanism and the hydraulic means, said mechanical spring mechanism and hydraulic means functioning to carry the load on either side of neutral position. In case of impact being transmitted through the device the mechanical spring mechanism and hydraulic means snub or absorb the slack in a resilient manner.

In operation the impeller D is normally poised by the air on the two opposite sides of the abutment 28 in chambers 33 and 34 and as the impeller reciprocates suction and air pressure alternately increase and decrease on the opposite sides of abutment 28 and in this manner a resilient support and buffer action are produced which reduces shocks and jars to a minimum between the body frame and the wheels and thus maintain the body in neutral position.

It is not necessary, within the spirit of my invention to employ all of the primary elements represented by the pneumatic means, the mechanical resilient means and the hydraulic means. Either one or more of these elements may be used independently and constitute an operable structure containing part or all of my improvements.

In the application of my improvement to the front or steering wheels of a vehicle, certain modifications in structure can, if desired be employed, Figs. 12 and 13 illustrating one form in which A' indicates the wheel and B' a detail portion of the body frame of a vehicle, to which the wheel is swiveled at 70 for steering purposes. F' represents the casing containing substantially the parts shown in Fig. 3 and mounted to reciprocate vertically on the frame by upwardly extending guide pins 71 and 72, carried rigidly on the side of casing F' and sliding through passages 73 and 74 in the frame. The shaft 75 projects outwardly through the casing from the impeller, in place of the hub 22 in Fig. 2 and terminates outwardly in a crank arm 76, the outer end of which is movably coupled to a link 77 which in turn is hung from the frame. This crank arm transmits the load of the frame to the impeller in the same manner as the load is transmitted to the casing in the structure shown in Fig. 3. This mechanism permits the wheel to swivel and to be guided by the steering mechanism while retaining a castor effect regardless of the position up and down of the frame. This structure is as readily applicable to driven wheels or where steering is not required.

In the structure shown in Fig. 3, the attachment of the load to the casing and transmitted to the impeller is eccentric, while in the structure shown in Figs. 12 and 13, the application of the load is to the axis of the wheel.

In Figs. 6 and 7, the mode of attaching the load, represented by the body frame B" to the casing F" is by means of the link 80 in substantially the same manner as above described. In this structure the wheel is mounted on the shaft 81 which is journaled in the hub 82 of the casing so that the wheel revolves independently of the casing. A drive shaft 83 is journaled in the body frame B" and is connected to drive the wheel by suitable intermediate gears 84 and 85. A suitable housing 86, containing the gears is swiveled to the body frame B" and attached to the impeller element C". In this manner the up and down movement of the wheel is in an arc concentric with the drive shaft 83 in the frame and the load is transmitted by the link 80.

In Figs. 8 and 9 the casing F''' is substantially the same in construction as in the previous description and its body 86 is attached to the frame B''' of the vehicle by bolting or any suitable fastening means for securing its cover 87 thereto. The live or driven axle 88 of the vehicle passes freely through the casing and carries a drive pinion 89 which in turn meshes with a driven gear 90, the latter being secured to the stud shaft 91. Said stud shaft is connected by an integral extension 92 with the impeller element C''' in the casing and has journaled freely thereon the wheel A'''. In this structure no link or its equivalent such as the part 35 above described is employed. Also the usual brake mechanism 93 may be employed which functions independently of the casing and the parts contained therein. In operation, power is transmitted from the shaft to the wheel through the gears 89 and 90, the latter being attached to the wheel and rigidly connected thereto. When thrust or other movement such as impact is imparted between the wheel and body frame, the wheel tends to swing the axially disposed stud shaft in an arc or stroke about a pivot, (the latter being the axis of the shaft 88) and the journal bearing 94 which is concentric therewith and seated in casing F'''. The function of the parts in the casing, namely the impeller and abutment described above is substantially the same as in the structure shown in Fig. 3.

In Figs. 10, and 11, the structure disclosed varies from the structure described in connection with Figs. 8 and 9 in as much as the hub is integral with impeller element 96 in the casing F'''' and is attached rigidly to the frame B''''. The casing F'''' is journaled on said hub and revolves concentric with the axis of the usual drive shaft 97. The mode of driving is substantially the same as in Figs. 8 and 9 and is by means of pinions 100 on shaft 97 and intermeshing gear 98 which is secured to the hub of the wheel A''''. In operation when an impact is imparted between the wheel and body to the casing F'''' and forces it against the rigidly mounted impeller mechanism in the casing, shocks and jars are absorbed. The action of the device is from a position in which the wheel normally is in neutral or substantially horizontal position as shown in Fig. 10. Variations in position occur through the arc in which the axis of the wheel travels. The arc of travel permits movement up and down quickly from neutral position and retards the movement of the load to a greater degree near the upper and lower limits of travel.

In accordance with the patent statutes, I have described the principles of operation of my invention, together with the construction thereof which I now consider to represent the best embodiment thereof, but I desire to have it understood that the construction shown is only illustrative and that the invention can be carried out by other means and applied to uses other than those above set forth within the scope of the following claims.

Having described my invention, what I claim as new and desire to secure by Letters Patent is:

1. A vehicle having a carrying wheel and an axle about which said wheel is revoluble, an abutment connected with said axle, a liquid holding enclosure concentric with said axle and in which said abutment is diametrically arranged to intercept said liquid, a rotary impeller concentric with and rotative about said axle and intercepting the liquid in said enclosure on one side of said abutment, and a load connected with and supported by the resisting torque of said impeller, whereby thrust movement between the wheel and load is converted into resisting torque to neutralize shocks and jars and resiliently support said load.

2. A vehicle having a carrying wheel and an axle about which said wheel is revoluble, an abutment carried by said axle, a liquid holding casing concentric with said axle and in which said abutment is diametrically arranged to intercept said liquid, a rotary impeller concentric with said axle and intercepting the liquid in said casing on one side of said abutment, a load connected with said impeller and supported by the resisting torque thereof, and a valved duct between opposite sides of said impeller in said casing adapted to retard the passage of liquid between the chambers in said casing on opposite sides of said impeller, whereby thrust movement between the wheel and load is converted into regulated resisting torque to neutralize shocks and jars and resiliently support said load.

3. A vehicle having a carrying wheel and an axle about which said wheel is revoluble, an abutment carried by said axle, a liquid holding casing concentric with said axle and in which said abutment is arranged transversely to intercept liquid in said casing, a rotary impeller concentric with said axle and also intercepting liquid in said casing on opposite sides of said abutment, a load connected with and entirely supported by said impeller through the resisting torque thereof and a valved duct between opposite sides of said impeller in said casing adapted to retard the passage of liquid between the chambers in said casing on opposite sides of said impeller, whereby thrust movement between the wheel and load is converted into regulated resisting torque to resiliently support said load.

4. A vehicle having running gear, an abutment carried by said gear, a liquid holding casing in which said abutment is transversely arranged to intercept liquid therein, a rotary impeller in said casing dividing the casing into chambers and also intercepting liquid therein on opposite sides of said abutment, a load connected with and entirely supported by said impeller through the resisting torque thereof, and a regulating duct between the chambers on opposite sides of said impeller in said casing adapted to retard the passage of liquid between said chambers, whereby thrust movement between the running gear and load is converted into regulated resisting torque to resiliently support said load.

5. A vehicle having running gear, an abutment connected with said running gear, an air holding enclosure in which said abutment is transversely arranged to intercept air therein, a revoluble impeller dividing the enclosure into air chambers on opposite sides of said abutment, and a load connected with and supported by said impeller whereby thrust movement between the running gear and load is converted into resisting torque to resiliently support said load.

6. A vehicle having running gear, an abutment carried by said gear, an air holding casing in which said abutment is transversely arranged to divide the casing into air holding compartments, an impeller revoluble and intercepting air in said compartments on opposite sides of said abutment, a load connected with said impeller and adapted to be supported by the resisting torque thereof, and a valved duct between the air chambers on opposite sides of said abutment in said casing, adapted to retard the passage of air between the chambers in said casing on opposite sides of said impeller.

7. A vehicle having running gear, a transmission abutment connected to said running gear, an enclosing fluid holding receptacle in which said abutment is stationary, a rotary impeller revoluble in said receptacle and dividing the latter into compartments on opposite sides of said abutment and adapted to resist rotary movement through fluid medium contained in said compartment, torque resisting springs between the opposite sides of said abutment and the opposite ends of said impeller and a load connected with and supported by the torque resisting movement of said impeller, whereby thrust movement between the gear and load is converted into spring resisted torque to neutralize shocks and jars and resiliently support said load.

8. A vehicle having a carrying wheel and an axle about which said wheel is revoluble, an abutment carried by said axle, an air holding casing concentric with said axle and in which said abutment is transversely arranged to divide the casing into air holding compartments, an impeller revoluble about said axle and intercepting air in said compartments on opposite sides of said abutment, a load connected with said impeller and adapted to be supported by the resisting torque thereof, and a valved duct between the air chambers on opposite sides of said abutment in said casing, adapted to resist the passage of air between the chambers in said casing and retard the action of said impeller.

9. A vehicle having a carrying wheel and an axle about which said wheel is revoluble, a transmission abutment connected to and extending from opposite sides of said axle, an enclosure in which said abutment is stationary, an impeller diametrically disposed to and revoluble about said axle, torque resisting springs between the opposite sides of said abutment and the opposite ends of said impeller and a load connected with said impeller and supported by the torque resisting movement thereof, whereby thrust movement between the gear and load is converted into spring resisted torque to neutralize shocks and jars and resiliently support said load.

10. A device of the class set forth, comprising, a fluid holding casing having a transverse abutment adapted to be associated with a revoluble element but comparatively stationary thereto, an impeller rotatively associated to said abutment to assist in forming fluid tight compartments on opposite sides thereof and adapted to be connected with a load to support the latter whereby thrust movement of the load is converted into rotative movement of said impeller through the fluid medium in said casing, and resilient means disposed on opposite portions of said abutment and impeller to assist in poising the load and retard reciprocable movement thereof in opposite directions.

11. A device of the class set forth, comprising, a cylindrical fluid holding casing having a transverse abutment therein adapted to be associated with a revoluble element but comparatively stationary thereto, an impeller in said casing rotatively associated with said abutment to assist in forming fluid tight compartments on opposite sides thereof and adapted to be movably connected with a load to support the latter whereby up and down movement of the load is converted into rotative movement of said impeller through the resistance offered by fluid medium in said casing, and resilient means disposed on opposite sides of said abutment and impeller to assist in poising the load and retard reciprocable movement thereof up and down.

12. A device of the class set forth, comprising, a fluid holding cylindrical casing having a diametrically disposed abutment therein adapted to be associated with a carrying element but comparatively non-rotative thereto, an impeller in said casing rotative therein to said abutment and adapted to movably carry a load whereby thrust movement of the load is converted into rotative movement of said impeller through the resistance offered by fluid medium in said casing, and compression means on opposite sides of and between said abutment and impeller adapted to assist in poising the load in neutral position and retard reciprocable movement thereof in opposite directions from neutral position.

13. A device of the class set forth, comprising, a cylindrical fluid holding casing having a diametrically disposed abutment therein adapted to be associated with a carrying element but comparatively non-rotative thereto, an impeller in said casing rotative therein and to said abutment and adapted to movably carry a load whereby thrust movement of the load through resistance offered by fluid medium in said casing is converted into rotative movement of said impeller, mechanical compression means on opposite sides of and between said abutment and impeller adapted to assist in poising the load in neutral position and retard reciprocable movement thereof in opposite directions from neutral position and means for adjusting the retarding strength of said impeller by said fluid medium.

14. A vehicle having a load supporting frame, a carrying wheel revoluble about an axle, an abutment, a liquid holding enclosure in which said abutment is transversely arranged to intercept liquid therein, a rotary impeller cooperating with said abutment and dividing the enclosure into liquid holding chambers, said abutment and impeller element being coaxial with said wheel, one of said impeller and liquid holding elements being connected with said frame and the other with said wheel, whereby thrust movement between the frame and wheel is converted into resisting torque to resiliently support said frame, and springs between the opposite sides of said impeller and the opposite ends of said abutment supplementing the torque resisting movement of said impeller.

15. A vehicle having a load supporting frame, a carrying wheel revolving about an axis, an abutment, an air holding enclosure in which said abutment is transversely arranged to intercept air therein, a rotary impeller cooperating with said abutment and dividing the enclosure into air chambers, said abutment and impeller element being coaxial with said wheel and one of said impeller and air holding enclosure elements being connected with said frame and the other with said wheel, springs between the opposite ends of said abutment and the opposite sides of said impeller supplementing the torque resisting movement of said impeller.

16. A vehicle having a load supporting frame, a carrying wheel revoluble about an axis, an abutment, a liquid holding enclosure in which said abutment is transversely arranged to intercept liquid therein, a rotary impeller cooperating with said abutment and dividing the enclosure into liquid holding chambers, said abutment and impeller being coaxial with said wheel, and one of said impeller and liquid holding elements being connected with said frame and the other with said wheel, whereby thrust movement between the frame and wheel is converted into resisting torque to resiliently support said frame.

17. A vehicle having running gear, an abutment connected with said running gear, a torque resisting medium enclosure in which said abutment is transversely arranged to intercept torque resisting medium therein, a revoluble impeller element dividing the enclosure into torque resisting medium chambers on one side of said abutment, a load connected with said impeller, and resilient means disposed between opposite sides of said impeller and abutment to assist in poising the load and retarding the reciprocable movement thereof.

18. A vehicle having running gear, a torque resisting fluid medium enclosure having an abutment disposed to resist fluid medium in said enclosure, a load, a revoluble impeller element dividing the enclosure into torque resisting compartments below opposed portions of said abutment, said impeller element being flexibly connected with said load, and compression springs attached to said abutment and converging downwardly and movably connected with the opposite sides of said impelling element to assist in poising the impelling element in neutral position and retarding the rotary movement thereof in either direction.

19. A vehicle having running gear, a torque resisting fluid medium enclosure having an abutment disposed to resist fluid medium in said enclosure, a load to which said enclosure is attached, a revoluble impeller element dividing the enclosure into a pair of opposed compartments and operating to intercept fluid medium therein, said impeller element being movably connected to said load, and opposed mechanical compression elements attached to the opposed sides of said impeller element and to said abutment, adapted to augment the torque resistance offered to said impeller element by the torque resisting fluid medium contained in said compartments.

20. A vehicle having a load supporting frame, a carrying wheel and an axle about which said wheel is revoluble, a torque resisting medium holding casing on said axle having an abutment extending diametrically and arranged to intercept torque resisting medium therein, an impeller dividing said casing into opposed torque resisting medium holding compartments, said impeller and abutment being movably disposed one to the other and connected one with said axle and the other with said frame, whereby said frame is resiliently supported by the casing and said opposed chambers being connected by a torque resisting medium passage to modify the resistance of said impeller.

21. A vehicle having a load supporting frame, a carrying wheel and an axle about which said wheel is revoluble, a torque resisting medium holding casing on said axle having an abutment extending diametrically and arranged to intercept torque resisting medium therein, an impeller dividing said casing into opposed torque resisting medium holding compartments, said impeller and abutment being movably disposed one to the other and connected one with said axle and the other with said frame, whereby said frame is resiliently supported by the casing and said opposed chambers being connected by a variable torque resisting medium passage to modify and vary the resistance of said impeller between the ends of its stroke.

22. A vehicle having a load supporting frame, a carrying wheel and an axle about which said wheel is revoluble, a torque resisting fluid holding casing on said axle having an abutment extending diametrically and arranged to intercept torque resisting fluid therein, an impeller dividing said casing into opposed torque resisting fluid holding compartments, said impeller and abutment being movably disposed one to the other and connected one with said axle and the other with said frame, whereby said frame is resiliently supported by torque resisting fluid in the casing and said opposed chambers being connected by a variable fluid releasing passage adapted to modify and equalize the resistance of said impeller between the ends of its stroke.

23. A vehicle having a load supporting frame, a carrying wheel and an axle about which said wheel is revoluble, a torque resisting fluid holding casing on said axle having an abutment extending diametrically and arranged to intercept torque resisting fluid therein, an impeller dividing said casing into opposed torque resisting fluid holding compartments adjoining said abutment, said impeller and abutment being movably disposed one to the other and connected one with said axle and the other with said frame, whereby said frame is resiliently supported by torque resisting fluid in the casing and said opposed chambers being connected by a fluid conducting passage through said impeller and an eccentric gate on said abutment in said passage adapted by the movement of said impeller to vary the opening of said passage and equalize the resistance of said impeller.

24. A vehicle having a load supporting frame, a carrying wheel and an axle about which said wheel is revoluble, a torque resisting fluid holding casing on said axle having an abutment extending diametrically and arranged to intercept torque resisting fluid therein, an impeller dividing said casing into opposed torque resisting fluid holding compartments adjoining said abutment, said impeller and abutment being movably disposed one to the other and connected one with said axle and the other with said frame, whereby said frame is resiliently supported by torque resisting fluid in the casing and said opposed chambers being connected by a fluid releasing passage through said impeller, an eccentric gate on said abutment in said passage adapted by the movement of said impeller to vary the opening of said passage and equalize the resistance of said impeller, and supplemental valved passages between said chambers for automatically regulating shock absorption by the impeller and abutment.

25. A vehicle having a load supporting frame, a carrying wheel and an axle about which said wheel is revoluble, a torque resisting fluid holding casing on said axle having an abutment extending diametrically and arranged to intercept torque resisting fluid therein, an impeller dividing said casing into opposed torque resisting fluid holding compartments adjoining said abutment, said impeller and abutment being movably disposed one to the other and connected one with said axle and the other with said frame, whereby said frame is resiliently supported by torque resisting fluid in the casing and said opposed chambers being connected by a fluid releasing passage through said impeller, an eccentric gate on said abutment in said passage, adapted by the movement of said impeller to vary the opening of said passage and equalize the resistance of said impeller, and adjustable supplemental valved passages between said chambers for automatically regulating shock absorption by the impeller and abutment.

26. A vehicle having a carrying wheel, a casing with which said wheel is revolubly associated to carry a load and to which said wheel is directly swiveled to permit steering, an impeller movably associated with said casing, a load supporting frame movably connected to and supported by said impeller, means for guiding said frame substantially vertically on said casing, and resilient means interposed between said impeller and casing upon which the weight of said frame is sprung and whereby said frame is resiliently supported.

27. A vehicle having a carrying wheel, a casing element with which said wheel is revolubly associated to carry a load and to which said wheel is directly swiveled to permit steering, an impeller element flexibly and resiliently associated with said casing element to resiliently support the load carried by said impeller element and permit free action of the wheel traveling over obstructions and a load carrying frame mounted upon said impeller element.

28. A vehicle having running gear, a torque resisting fluid medium enclosure having an abutment disposed to resist fluid medium in said enclosure, a load, a revoluble impeller element dividing the enclosure into torque resisting compartments below opposed portions of said abutment, said impeller element being flexibly connected with said load, and compression elements attached to said abutment and movably connected with the opposite sides of said impelling element to assist in poising the impelling element in neutral position and retarding the rotary movement thereof in either direction.

29. A vehicle having running gear, a torque resisting fluid medium enclosure having an abutment disposed to resist fluid medium in said enclosure, a load, a revoluble impeller element dividing the enclosure into torque resisting compartments below opposed portions of said abutment, said impeller element being connected with said load, and compression springs attached to said abutment and movably connected with the opposite sides of said impelling element to assist in poising the impelling element in neutral position and retarding the rotary movement thereof in either direction.

30. A vehicle having running gear including a revoluble wheel, an abutment carried by said gear, a liquid holding casing in which said abutment is transversely arranged to intercept liquid therein on opposite sides of the abutment, a rotary impeller in said casing dividing the casing into chambers and also intercepting liquid therein, a load connected with and entirely supported by said impeller through the resisting torque thereof, a regulating duct between the chambers on opposite sides of said impeller in said casing adapted to retard the passage of liquid between said chambers, whereby thrust movement between the running gear and load is converted into regulated resisting torque to resiliently support said load, and means on said running gear for revolving said wheel.

31. A vehicle having running gear including a revoluble wheel, an abutment connected with said running gear, an enclosure in which said abutment is transversely arranged to intercept resisting means therein, a revoluble impeller dividing the enclosure into chambers on opposite sides of said abutment, and a load connected with and supported by said impeller whereby thrust movement between the running gear and load is converted into resisting torque to resiliently support said load and internal means traversing said running gear for driving said wheel.

32. A vehicle having a load supporting frame, a carrying wheel revoluble about an axis, an abutment connected with said wheel, a rotary impeller cooperating with said abutment, a load carried by said impeller, resilient means interposed between said abutment and impeller to provide torque resistance to the movement of the impeller, and means coaxial with said wheel for revolving the latter.

33. A vehicle having a load supporting frame, a carrying wheel revoluble about an axis, an abutment connected with said wheel, a rotary impeller cooperating with said abutment and by which said load supporting frame is carried, resilient means interposed between said abutment and impeller to provide torque resistance to the movement of the impeller, and means internally applied to said wheel for revolving the latter.

34. A vehicle having a load supporting frame, a carrying wheel revoluble about an axis, an abutment connected with said wheel, a rotary impeller cooperating with said abutment and by which said load supporting frame is carried, resilient means interposed between said abutment and impeller to provide torque resistance to the movement of the impeller, and means axially applied to said wheel for revolving the latter.

KENNETH A. BRAINARD.